Patented July 10, 1951

2,559,583

UNITED STATES PATENT OFFICE 2,559,583

SOLID COMPOSITIONS CONTAINING POLY-OXYETHYLENE ESTERS

George E. Barker, Wilmington, Del., assignor to Atlas Powder Company, Wilmington, Del., a corporation of Delaware No Drawing. Application January 23, 1948, Serial No. 4,080

19 Claims. (Cl. 252—152)

1

The present invention relates to solid compositions containing polyoxyethylene esters of carboxylic acids.

An object of the invention is to provide a solid composition containing a polyoxyethylene ester of a carboxylic acid.

Another object is to provide a method for solidifying a normally liquid to soft waxy polyoxyethylene ester of a carboxylic acid.

A further object is to provide a solid detergent composition containing a normally liquid to soft waxy polyoxyethylene ester of a carboxylic acid.

A still further object is to provide means for controlling the rate of solution of a water-soluble polyoxyethylene detergent composition by incorporating it into a solid combination which can be formed into the shape of bars or the like and used after the fashion of hard soap.

The above and other objects will become more fully apparent in the course of the following description.

Polyoxyethylene esters of carboxylic acids constitute a class of increasingly valuable chemical materials. In this class are emulsifiers, detergents, surface active agents, solvents, conditioning agents, and the like. A number of the esters in this class are liquids or are soft waxy materials under ordinary conditions. It is well-known in the art that the consistency of such compounds depends on the number of oxyethylene groups and on the carbon chain length and nature of any radicals attached to the oxyethylene group. While it is therefore possible to find individual esters which are normally solid, it frequently happens that for a particular use the preferable, and often the only operative compounds, are normally liquid or soft waxy substances. It is desirable for some end uses of these polyoxyethylene ester to have them in solid form, for example, in molded bars, tablets, chips, or powders. The conventional solution to such a problem is generally either to absorb the liquid or soft material in a solid carrier or to dissolve in the material some substances which will increase its body or cause it to gel. There are objections to these approaches to the problem, particularly in that physically suitable absorbents or bodying agents are often unsuitable for the intended end use of the polyoxyethylene ester, or undesirable proportions of the absorbent or bodying agent may be required.

In accordance with the present invention, it has been discovered that many of the normally liquid to soft waxy polyoxyethylene esters form solid mixtures with urea. The scientific explanation of this phenomenon is not known but it is believed to be quite different from the action of absorbents or bodying or gelling agents referred to above. The effect is specific to certain classes of the polyoxyethylene esters. On mixing together a quantity of finely divided solid urea and one of the operative polyoxyethylene esters, the product is initially a soft, moldable mixture, but on standing for a short time, the mixture undergoes concretion and sets up to a solid mass which can be used as such or reduced to smaller pieces. As they set up, many of the compositions show a marked increase in volume which is often sufficient in extent, for example, to cause the breakage of a glass beaker containing the composition. The solidification or concretion is not associated with loss of water. In some specific embodiments of the invention, compositions made with substantial quantities of water solidify without appreciable loss of weight. The final concreted product is not heat softened until the temperature is raised to about the melting point of the urea.

One of the most valuable features of the invention at the present time resides in the preparation in solid form of some of the more valuable polyoxyethylene ester detergent compounds which are normally liquids or soft waxes. By means of the invention, these detergents can be prepared in bar, chipped, or granulated form. The urea in the composition is water-soluble and unobjectionable for this end use. Additives such as inorganic soap builders, foaming agents, emollients, supplementary detergents, germicides, etc., can be included in the compositions to impart their conventional properties.

Other typical end uses for the compositions of the invention are in various emulsifying operations, as in cosmetic and pharmaceutical manufacture, the preparation of petroleum oil emulsions, textile conditioning and lubricating emulsions, insecticidal and fungicidal emulsions, and the like. In some of these uses the urea serves a recognized purpose, for example, as a stabilizer or antacid. By means of the invention, the normally liquid or soft waxy polyoxyethylene esters can be used in solid form with substantial advantages in packaging, handling and measurement. Molded, pressed or cut pieces can be readily prepared to contain any desired constant quantity of the polyoxyethylene ester so that accurate quantities can be measured by the user by simple count and without weighing or making a volume measurement.

The polyoxyethylene esters useful in the present invention are the esters of the aliphatic carboxylic acids which have from 12 to 30 carbon atoms, the esters of the carboxylic rosin acids, and the esters of mixtures of aliphatic and rosin acids. It has been found that in order to undergo the solidification with urea, the esters of the aliphatic carboxylic acids with from 12 to 15 carbon atoms should have at least 5 oxyethylene groups per acid radical. Where esters of the aliphatic carboxylic acids with from 16 to 30 carbon atoms are employed, solidification with urea occurs where the esters contain at least 2 oxyethylene groups per acid radical. In the case of the esters of the rosin acids, it is also sufficient to have a minimum of 2 oxyethylene groups per acid radical. It will be understood that for most detergent and emulsifying purposes, it will be necessary or at least desirable to employ considerably more than the minimum number of oxyethylene groups in the esters. The recited limits are minimum requirements before the esters exhibit the solidification phenomenon when mixed with urea.

The aliphatic carboxylic acids that are useful in forming the esters referred to herein are those which are found in the form of glycerides in the natural animal and vegetable fats and oils as well as their analogs which are made synthetically from hydrocarbon or other sources, or are recovered as by-products such as the tall oil obtained from paper manufacture. Typical saturated acids in this series are lauric, myristic, pentadecanoic, palmitic, stearic, behenic, and melissic. Typical unsaturated acids are oleic, linoleic, linolenic, erucic, eleostearic, clupanodonic, palmitoleic, and ricinoleic. Typical hydroxy acids are ricinoleic and the several hydroxy stearic acids. The rosin acids are exemplified by abietic acid and congeneric acids. Tall oil is a valuable mixture of carboxylic aliphatic and rosin acids, the aliphatic acids being predominantly 18 carbon unsaturated acids. The polyoxyethylene esters of these acids may be made by esterifying polyglycols, which have the desired number of oxyethylene groups, with the acids, or by reacting the acids with ethylene oxide in the selected mol ratio. Where polyglycols are used as the source of the polyoxyethylene radical, mono or diesters can be made by the use of one or two mols of acid respectively per mol of polyglycol in the esterification reaction. The ethylene oxide reaction being conducted in a closed vessel under pressure produces predominantly mono-esters, and if di-esters are to be formed, a subsequent reaction under conditions favoring esterification is required.

The most valuable polyoxyethylene esters from the standpoint of commercial utility are those that have six or more oxyethylene groups per acid radical. For use as detergents, the preferable compounds are water-soluble or very readily dispersible in water and contain 15 or more oxyethylene groups and have acid radicals with 16 or more carbon atoms.

The polyoxyethylene esters referred to above belong to well-known chemical classes and many of the specific members of the classes have been described in the literature. The esterification of polyethylene glycols and carboxylic acids is a simple esterification reaction. The reaction of ethylene oxide and carboxylic acids is likewise a well-known one which takes place readily in an autoclave at moderate temperature. Both types of reactions are described, for example, in the patent to Schoeller and Wittwer, 1,970,578. As prepared commercially, these polyoxyethylene esters are invariably mixtures of related compounds of the same chemical type, due to the use of commercial grade acids and to the use of the ethylene oxide reaction or commercial mixtures of polyethylene glycols. The use of the term "compound" in this specification and in the claims is for purpose of convenience and is not to be taken as exclusive of mixtures of compounds.

It will be noted that in describing the polyoxyethylene esters, the minimum number of oxyethylene groups is stated but not the maximum number. This is for the reason that the solidification or concretion phenomenon with urea, on which the invention is based, occurs with all of the higher polyoxyethylene compounds. It is well-known that these polyoxyethylene compounds become harder waxes as the number of oxyethylene groups is increased. The number of oxyethylene groups at which a given hardness is exhibited will depend on the chemical nature and size of the radicals to which the polyoxyethylene chains are bonded. The upper limit of the number of oxyethylene groups in the esters useful in the invention does not depend on a loss of solidifying tendency with urea, but is a practical limit depending on the intended use of the composition. For example, if the property desired is merely physical hardness, it would be unnecessary to use the invention in the upper ranges of oxyethylene content because there the compounds have the requisite hardness. On the other hand, if the objective is to reduce the rate of solution in water, it may be desirable to use the invention even with those esters which are hard waxes at the temperatures prevailing in the intended use.

As stated above, a particularly useful subgroup of the polyoxyethylene esters comprises those which are water-soluble. By forming the mixture of urea and a water-soluble polyoxyethylene ester into a relatively large shaped body such as a cake or bar, the rate of solution of the ester in water is greatly retarded. This makes it possible to prepare a detergent bar which can be used like bar soap even though the water-solubility of the detergent polyoxyethylene ester far exceeds that of soap.

The compositions of the invention can be made by either of two methods. In the first method the selected polyoxyethylene ester is intimately mixed with finely divided urea forming a soft moldable mixture which is then set aside and allowed to set-up. In this method the urea is employed in solid form and the polyoxyethylene ester is used cold if it is normally liquid, or is warmed to reduce it to the liquid state if it is a normally waxy material. The aging or setting up stage of this method may occupy from a few hours to several days time, depending on the particular ester used and the proportions of ester and urea.

In the second method for practising the invention, the urea is carefully melted and the polyoxyethylene ester intimately mixed with the molten urea. Care must be taken in this method not to over-heat the urea since it readily decomposes. This method is best practised by heating the urea under carefully controlled conditions such as in an oil bath and rapidly mixing in the ester to form the mixture. After mixing, the composition can be poured into suitable molds and allowed to solidify.

The end products of the two methods appear to be essentially the same. The second method does not require the prolonged setting-up period required by the first method. However, the same limitations on the polyoxyethylene esters have been observed to apply to both methods of making the compositions.

The proportions of polyoxyethylene compound and urea may be varied within fairly wide limits. There is a limit to the proportion of liquid or soft polyoxyethylene ester that may be used to obtain the solid compositions of the invention. The exact value of this limit depends on the particular ester. In general, the best compositions of this invention are found in the range 50 to 90% urea and 50 to 10% polyoxyethylene ester. Especially useful compositions have been found in the approximate proportion of 70% urea and 30% polyoxyethylene ester.

The following table sets forth several examples of solid compositions in accordance with the invention. The tabulated examples were carried out in accordance with the first method described above. In each case finely divided urea in the indicated quantity was placed in a mixing bowl and the polyoxyethylene ester was slowly added in liquid form (melted if necessary) while stirring with a motor-driven stirrer to obtain adequate mixing. After mixing was completed, the compositions were placed in containers and set aside to harden. Under the heading "remarks," the table indicates the time at which the composition was observed to have set-up.

EXAMPLE 31

A detergent bar was prepared containing by weight 30% of the polyoxyethylene mono-ester of tall oil averaging 16 oxyethylene groups per mol, 1% sodium carboxy methyl cellulose, 9% water, 30% tetra-sodium pyrophosphate, and 30% urea. The sodium carboxy methyl cellulose was first dissolved in the water and this solution was then dispersed in the tall oil ester. The tetra-sodium pyrophosphate and urea were mixed together and then incorporated into the liquid ester and cellulose derivative mixture. After incorporation was complete, the soft mixture was placed in a mold and was observed to set to a firm bar within a few hours. In this example, the phosphate was employed for its well-known detergent properties and the cellulose derivative contributed to the physical characteristics of the bar.

EXAMPLE 32

Another detergent bar was prepared from a mixture containing by weight 32% of the polyoxyethylene mono-ester of tall oil, averaging 16 oxyethylene groups per mol, 5% lanolin, 3% sodium carboxy methyl cellulose, 17% water and 43% urea. The lanolin was first dissolved in the tall oil ester and to this solution was added the cellulose derivative dissolved in the water. The two solutions were mixed and heated to 70° F. at which time the urea was added while stirring

*Solid compositions from urea and polyoxyethylene esters*

| Example | Detergent | Quantity (Grams) | Urea Quantity (Grams) | Remarks |
|---|---|---|---|---|
| 1 | Polyoxyethylene mono-ester of tall oil, averaging sixteen oxyethylene groups per mol. | 10 | 90 | Set after 4 hours storage. |
| 2 | ----do---- | 20 | 80 | Cake hard after 29 hours storage. |
| 3 | ----do---- | 30 | 70 | Cake very hard after 48 hours. |
| 4 | ----do---- | 50 | 50 | Cake hard after 5 days storage. |
| 5 | Polyoxyethylene mono-ester of tall oil, averaging twelve oxyethylene groups per mol. | 50 | 50 | Do. |
| 6 | Polyoxyethylene mono-ester of tall oil, averaging 8 oxyethylene groups per mol. | 30 | 70 | Do. |
| 7 | Polyoxyethylene mono-ester of tall oil, averaging 6 oxyethylene groups per mol. | 30 | 70 | Do. |
| 8 | Polyoxyethylene mono-ester of tall oil, averaging 20 groups per mol. Polyoxyethylene mono-ester of tall oil, averaging 4 oxyethylene groups per mol. | 25 25 | 50 | Cake hard after 2 days storage. |
| 9 | Polyoxyethylene mono-ester of rosin (abietic acid), averaging 14 oxyethylene groups per mol. | 20 | 80 | Cake hard after 24 hours. |
| 10 | ----do---- | 30 | 70 | Do. |
| 11 | Polyoxyethylene mono-ester of rosin (abietic acid), averaging 20 oxyethylene groups per mol. | 30 | 70 | Do. |
| 12 | Polyoxyethylene mono-ester of lauric acid, averaging 8 oxyethylene groups per mol. | 30 | 70 | Cake hard after 4 days. |
| 13 | Polyoxyethylene mono-esters of mixed coconut oil fatty acids, averaging 5 oxyethylene groups per mol. | 30 | 70 | Do. |
| 14 | Polyoxyethylene mono-esters of mixed coconut oil fatty acids, averaging 10 oxyethylene groups per mol. | 30 | 70 | Do. |
| 15 | Polyoxyethylene mono-esters of mixed coconut oil fatty acids, averaging 15 oxyethylene groups per mol. | 30 | 70 | Cake hard after 3 days. |
| 16 | Polyoxyethylene mono-esters of mixed coconut oil fatty acids, averaging 20 oxyethylene groups per mol. | 30 | 70 | Do. |
| 17 | Polyoxyethylene mono-esters of mixed coconut oil fatty acids, averaging 50 oxyethylene groups per mol. | 30 | 70 | Do. |
| 18 | Polyoxyethylene mono-ester of palmitic acid, averaging 20 oxyethylene groups per mol. | 30 | 70 | Cake hard after 2 days. |
| 19 | Polyoxyethylene mono-ester of stearic acid, averaging 2 oxyethylene groups per mol. | 30 | 70 | Cake hard after 5 days. |
| 20 | Polyoxyethylene mono-ester of stearic acid, averaging 7 oxyethylene groups per mol. | 30 | 70 | Cake hard after 2 days. |
| 21 | Polyoxyethylene mono-ester of stearic acid, averaging 10 oxyethylene groups per mol. | 30 | 70 | Cake hard after 24 hours. |
| 22 | Polyoxyethylene mono-ester of stearic acid, averaging 15 oxyethylene groups per mol. | 30 | 70 | Do. |
| 23 | Polyoxyethylene mono-ester of stearic acid, averaging 40 oxyethylene groups per mol. | 30 | 70 | Do. |
| 24 | Polyoxyethylene mono-ester of oleic acid, averaging 2 oxyethylene groups per mol. | 30 | 70 | Cake hard after 5 days. |
| 25 | Polyoxyethylene mono-ester of oleic acid, averaging 4 oxyethylene groups per mol. | 30 | 70 | Do. |
| 26 | Polyoxyethylene mono-ester of oleic acid, averaging 6 oxyethylene groups per mol. | 30 | 70 | Do. |
| 27 | Polyoxyethylene mono-ester of oleic acid, averaging 8 oxyethylene groups per mol. | 30 | 70 | Do. |
| 28 | Polyoxyethylene distearate, averaging 35 oxyethylene groups per mol. | 30 | 70 | Cake hard after 1 day. |
| 29 | Polyoxyethylene dilaurate, averaging 35 oxyethylene groups per mol. | 30 | 70 | Do. |
| 30 | Polyoxyethylene diester of tall oil, averaging 35 oxyethylene groups per mol. | 30 | 70 | Do. | the mixture. After mixing was completed, the mixture, which was in the form of slurry, was placed in a mold and allowed to set for several hours at the end of which time the mixture was observed to have solidified forming a firm bar. In this formulation, the lanolin constitutes an emolient.

The second formulating method is illustrated in the following two examples.

EXAMPLE 33

140 grams of urea were heated to 132 to 135° C. in a tall beaker set in an oil bath. When the urea was almost completely melted, 60 grams of the polyoxyethylene mono-ester of tall oil averaging 16 oxyethylene groups per mol were added and the mixture stirred mechanically until uniform when it was poured into molds and allowed to cool. Upon solidification, the bars were ejected from the molds. In preparing the composition by this method, it is necessary to avoid overheating and prolonged heating of the urea to prevent decomposition.

EXAMPLE 34

130 grams of urea and 5 grams of sodium-carboxy methyl cellulose were melted together by heating at 132 to 135° C. on an oil bath. With rapid mechanical agitation, 60 grams of the polyoxyethylene mono-ester of tall oil, averaging 16 oxyethylene groups per mol, and 5 grams of lanolin were added. Agitation was continued until a uniform mixture was obtained. The melted mass was then poured into a mold, cooled, and removed, producing a smooth hard cake.

It is to be understood that the hot melt technique illustrated by the last two examples may be applied as well to the production of the other compositions included within the scope of the invention. Where satisfactory arrangements are available for carefully melting the urea and rapidly mixing the other ingredients, the hot melt method will be preferable. An obvious advantage of the hot melt method is reducing the length of the setting up period which, in the case of the compositions produced by the cold method, may require storage for periods up to several days. However, the cold method involves a much simpler mixing operation and, for this reason, may be preferred in many cases.

The foregoing examples illustrate a wide range of compositions according to the invention. The invention is not, however, to be taken as limited to the specific ingredients, proportions or preparatory methods given by way of example. The preferred embodiment of the invention for detergent use is the composition containing the polyoxyethylene tall oil mono-ester with an average of about 16 oxyethylene groups per mol. It will be understood that this product is a mixture of polyoxyethylene esters of the various aliphatic and rosin acids found in tall oil. There is also a variation in the polyoxyethylene chain lengths of the different esters whether the product be made by an ethylene oxide reaction or by esterification with a commercially available polyethylene glycol mixture. The method of producing the tall oil ester is such, however, that there is an average of 16 oxyethylene groups per mol of carboxylic acid.

What is claimed is:

1. A composition consisting essentially of the solid concretion product of urea and at least one normally liquid to soft waxy polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxy acids wherein the esters contain at least 2 oxyethylene groups per acid radical, and (c) polyoxyethylene esters of rosin acids wherein the esters contain at least 2 oxyethylene groups per acid radical; said solid concretion product containing at least 10 per cent by weight of said polyoxyethylene ester.

2. A composition consisting essentially of the solid concretion product of urea and at least one normally liquid to soft waxy polyoxyethylene ester of a 16 to 30 carbon atom aliphatic carboxylic acid, wherein the ester contains at least 2 oxyethylene groups per acid radical; said solid concretion product containing at least 10 per cent by weight of said polyoxyethylene ester.

3. A composition consisting essentially of the solid concretion product of urea and a normally liquid to soft waxy polyoxyethylene ester of tall oil wherein the ester contains at least 2 oxyethylene groups per acid radical; said solid concretion product containing at least 10% by weight of said polyoxyethylene ester.

4. A composition consisting essentially of the solid concretion product of urea and a polyoxyethylene ester of tall oil wherein the ester contains about 16 oxyethylene groups per acid radical; said solid concretion product containing at least 10 per cent by weight of said polyoxyethylene ester.

5. A solid composition consisting essentially of the concretion product of normally liquid to soft waxy from 50 to 10% by weight of at least one polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxylic acids wherein the esters contain at least 2 oxyethylene groups per acid radical, and (c) polyoxyethylene esters of rosin acids wherein the esters contain at least two oxyethylene groups per acid radical; and from 50 to 90% by weight urea.

6. A solid composition as defined in claim 5 wherein the said polyoxyethylene ester is water-soluble.

7. A solid composition as in claim 6 wherein the said ester is a polyoxyethylene ester of a rosin acid.

8. A solid composition consisting essentially of the concretion product of from 50 to 10% by weight of at least one normally liquid to soft waxy polyoxyethylene ester of a 16 to 30 carbon atom aliphatic carboxylic acid wherein said ester contains at least 2 oxyethylene groups per acid radical; and from 50 to 90% by weight urea.

9. A solid composition consisting essentially of the concretion product of from 50 to 10% by weight of a normally liquid to soft waxy polyoxyethylene ester of tall oil wherein said ester contains at least 2 oxyethylene groups per acid radical; and from 50 to 90% by weight urea.

10. A solid composition as defined in claim 9 wherein the said polyoxyethylene ester of tall oil is a mono-ester containing about 16 oxyethylene groups per mol.

11. A solid composition consisting essentially of the concretion product of about 30% by weight of at least one normally liquid to soft waxy polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxylic acids wherein the esters contain at least 2 oxyethylene groups per acid radical, and (c) polyoxyethylene esters of rosin acids wherein the esters contain at least 2 oxyethylene groups per acid radical; and about 70% by weight urea.

12. The method which comprises intimately admixing urea and at least one normally liquid to soft waxy polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxylic acids wherein the esters contain at least 2 oxyethylene groups per acid radical, and (c) polyoxyethylene esters of rosin acids wherein the esters contain at least 2 oxyethylene groups per acid radical; the quantity of urea so admixed being sufficient to combine with said ester to form a concreted mixture; and allowing the mixture to set up to solid form.

13. The method defined in claim 12 wherein the said urea is employed in the proportion of from 50 to 90% by weight and the said polyoxyethylene ester is employed in the proportion of from 50 to 10% by weight.

14. The method which comprises intimately admixing finely divided solid urea and at least one normally liquid to soft waxy polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxylic acids wherein the esters contain at least 2 oxyethylene groups per acid radical, and (c) polyoxyethylene esters of rosin acids wherein the esters contain at least 2 oxyethylene groups per acid radical; the quantity of urea so admixed being sufficient to combine with said ester to form a concreted mixture; and allowing the mixture to set up to solid form.

15. The method defined in claim 14 wherein the said urea is employed in the proportion of from 50 to 90% by weight and the said polyoxyethylene ester is employed in the proportion of from 50 to 10% by weight.

16. The method which comprises intimately admixing molten urea and at least one normally liquid to soft waxy polyoxyethylene ester selected from the group consisting of: (a) polyoxyethylene esters of 12 to 15 carbon atom aliphatic carboxylic acids wherein the esters contain at least 5 oxyethylene groups per acid radical, (b) polyoxyethylene esters of 16 to 30 carbon atom aliphatic carboxylic acids wherein the esters contain at least 2 oxyethylene groups per acid radical, and (c) polyoxyethylene esters of rosin acids wherein the esters contain at least 2 oxyethylene groups per acid radical; the quantity of urea so admixed being sufficient to combine with said ester to form a concreted mixture; and allowing the mixture to set up in solid form.

17. The method defined in claim 16 wherein the said urea is employed in the proportion of from 50 to 90% by weight and the said polyoxyethylene ester is employed in the proportion of from 50 to 10% by weight.

18. The method for reducing the rate of solution in water of a water-soluble normally liquid to soft waxy polyoxyethylene ester of a carboxylic acid selected from the group consisting of: (a) aliphatic carboxylic acids with from 12 to 15 carbon atoms, (b) aliphatic carboxylic acids with from 16 to 30 carbon atoms, and (c) rosin acids, which ester contains at least six oxyethylene groups per mol; which comprises intimately mixing said ester with at least an equal quantity by weight of urea, and allowing the mixture to set up to solid form.

19. A composition consisting essentially of the solid concretion product of urea and a normally liquid to soft waxy polyoxyethylene ester of rosin acids wherein the ester contains at least 2 oxyethylene groups per acid radical; said solid concretion product containing at least 10% by weight of said polyoxyethylene ester.

GEORGE E. BARKER.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,374,187 | Flett | Apr. 24, 1945 |

FOREIGN PATENTS

| Number | Country | Date |
|---|---|---|
| 443,795 | Great Britain | Mar. 6, 1936 |
| 469,334 | Great Britain | July 23, 1937 |

Certificate of Correction

Patent No. 2,559,583     July 10, 1951

GEORGE E. BARKER

It is hereby certified that error appears in the printed specification of the above numbered patent requiring correction as follows:

Column 1, line 39, for "ester" read *esters*; column 8, lines 33 and 34, strike out "normally liquid to soft waxy" and insert the same in line 34, after "one"; and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*